United States Patent
Mason

(10) Patent No.: US 9,310,068 B1
(45) Date of Patent: Apr. 12, 2016

(54) MOTORCYCLIST SAFETY HARNESS

(71) Applicant: Ronald Mason, Woodbridge Township, NJ (US)

(72) Inventor: Ronald Mason, Woodbridge Township, NJ (US)

( * ) Notice: Subject to any disclaimer, the term of this patent is extended or adjusted under 35 U.S.C. 154(b) by 297 days.

(21) Appl. No.: 14/160,090

(22) Filed: Jan. 21, 2014

(51) Int. Cl.
- *F21V 33/00* (2006.01)
- *F21V 23/00* (2015.01)
- *F21V 23/04* (2006.01)

(52) U.S. Cl.
CPC ............ *F21V 33/0008* (2013.01); *F21V 23/003* (2013.01); *F21V 23/04* (2013.01); *F21V 33/0076* (2013.01)

(58) Field of Classification Search
CPC .............. F21V 33/0008; F21V 23/003; F21V 33/0076; F21V 23/04
See application file for complete search history.

(56) References Cited

U.S. PATENT DOCUMENTS

| | | |
|---|---|---|
| 4,328,533 A | 5/1982 | Paredes |
| 6,106,130 A | 8/2000 | Harding |
| 6,538,567 B2 | 3/2003 | Stewart |
| 6,834,395 B2 | 12/2004 | Fuentes |
| 6,997,573 B2 | 2/2006 | Maese |
| 7,377,663 B2 | 5/2008 | Desjardin |
| D624,247 S | 9/2010 | Thind |
| 8,009,031 B2 | 8/2011 | Pacheco et al. |
| 2008/0089056 A1* | 4/2008 | Grosjean .............. B60Q 1/2673 362/103 |
| 2014/0078773 A1* | 3/2014 | Curran ................ F21V 33/0008 362/555 |
| 2014/0254143 A1* | 9/2014 | Wansor ............... F21V 33/0008 362/103 |
| 2015/0276202 A1* | 10/2015 | Haslem, Sr. ........ F21V 33/0008 362/108 |

* cited by examiner

*Primary Examiner* — David V Bruce
(74) *Attorney, Agent, or Firm* — Kyle A. Fletcher, Esq.

(57) ABSTRACT

An illumination assembly for making a driver of a vehicle visible to an observer includes a front panel and a back panel that may be positioned on the driver. A shoulder strap is coupled to the front and back panels. A primary processor is coupled to the front panel. A primary transceiver is coupled to the front panel. A light emitter is coupled to the back panel. The light emitter selectively emits light. The light emitter may make the driver visible to the observer. A remote control may be selectively coupled to the vehicle. A remote processor is coupled to the remote control. A remote transceiver is coupled to the remote control. The remote transceiver is operationally coupled to the primary transceiver. An actuator is coupled to the remote control. The actuator is operationally coupled to the remote processor.

20 Claims, 5 Drawing Sheets

MOTORCYCLIST SAFETY HARNESS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of motorcycles, more specifically, a safety harness worn by a motorcyclist.

SUMMARY OF THE INVENTION

An embodiment of the disclosure meets the needs presented above by generally comprising a front panel that may be positioned on the driver. A back panel may be positioned on the driver. A shoulder strap is coupled to the front and back panels. The front and back panels are retained on the driver. A primary processor is coupled to the front panel. A primary transceiver is coupled to the front panel. The transceiver is operationally coupled to the processor. A light emitter is coupled to the back panel. The light emitter is operationally coupled to the processor. The light emitter selectively emits light. The light emitter may make the driver visible to the observer. A remote control may be selectively coupled to the vehicle. A remote processor is coupled to the remote control. A remote transceiver is coupled to the remote control. The remote transceiver is operationally coupled to the remote processor. The remote transceiver is operationally coupled to the primary transceiver. The remote transceiver selectively actuates the primary processor. An actuator is coupled to the remote control. The actuator is operationally coupled to the remote processor. The actuator selectively actuates the remote processor. The remote processor selectively actuates the remote transceiver.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
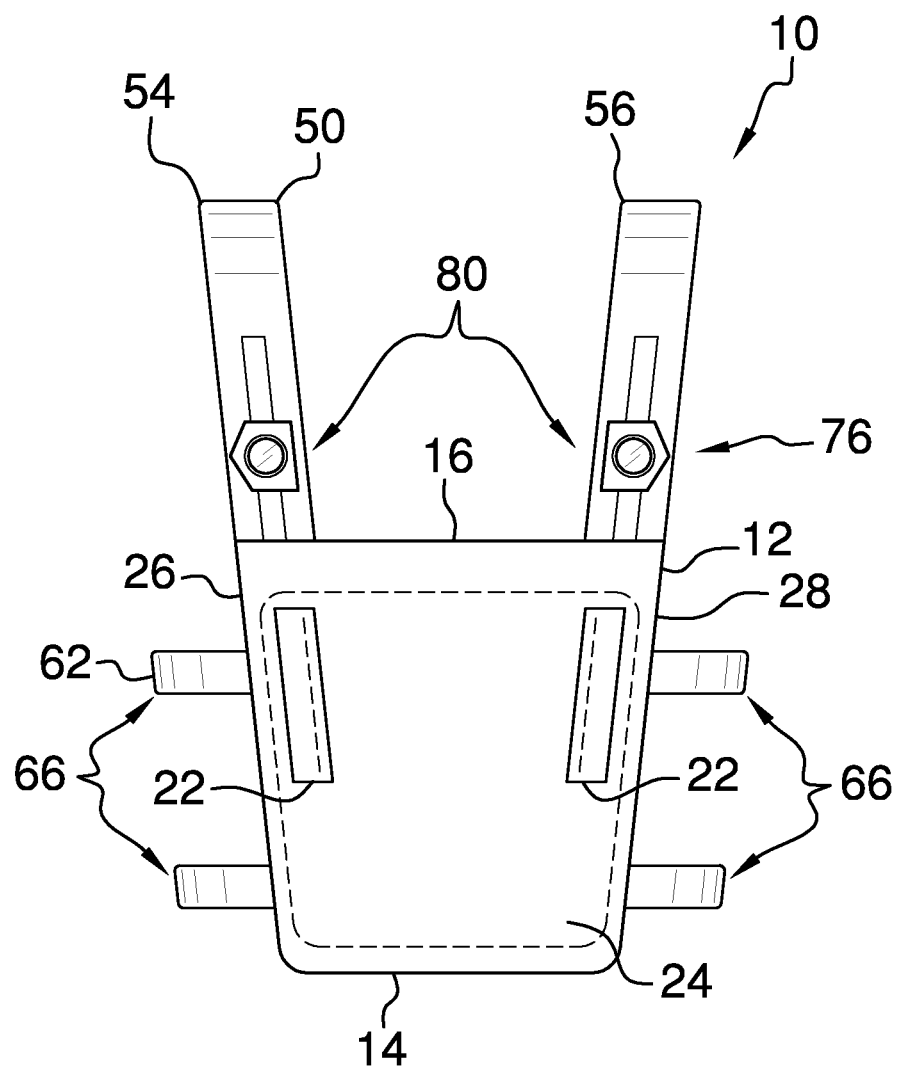
FIG. 1 is a front view of a illumination assembly according to an embodiment of the disclosure.
Figure 2:
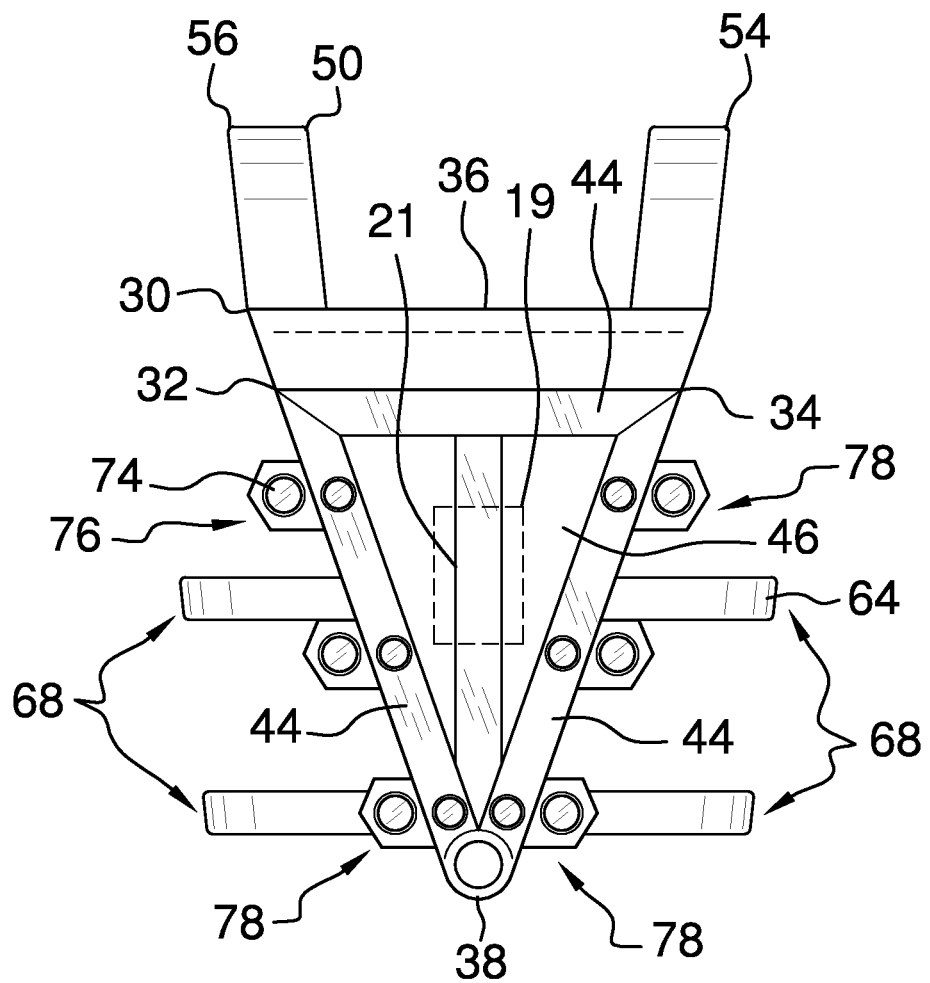
FIG. 2 is a back view of an embodiment of the disclosure.
Figure 3:
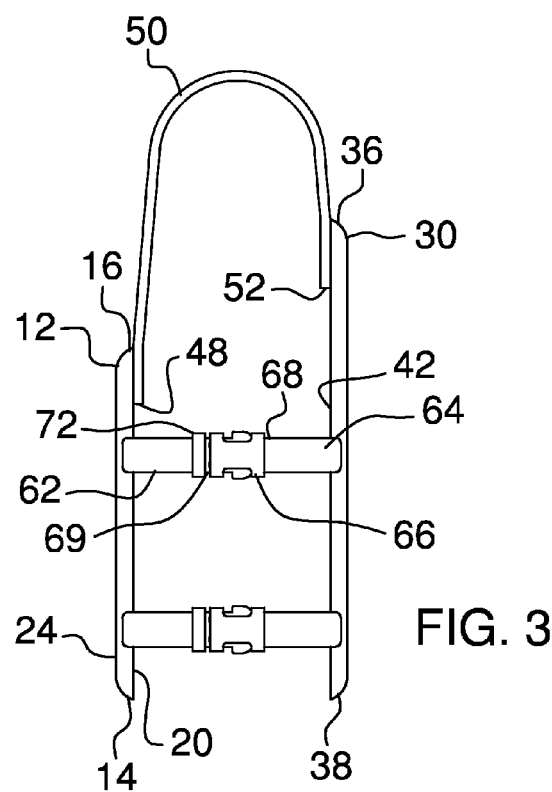
FIG. 3 is a left side view of an embodiment of the disclosure.
Figure 4:
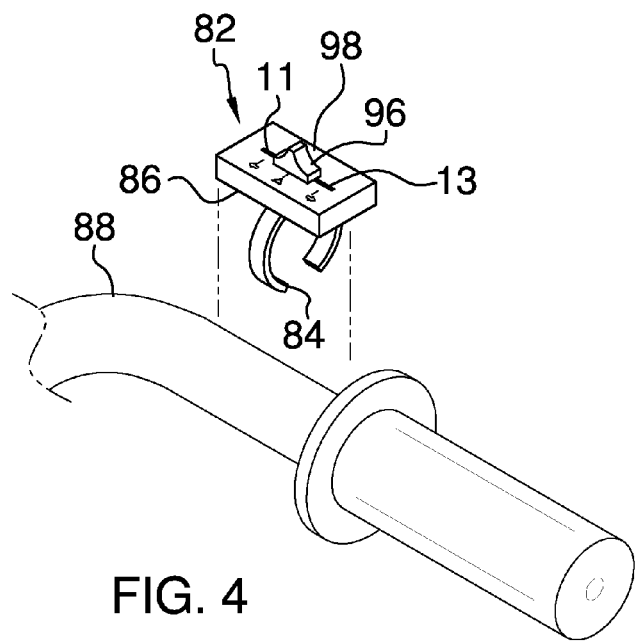
FIG. 4 is a perspective view of an embodiment of the disclosure.
Figure 5:
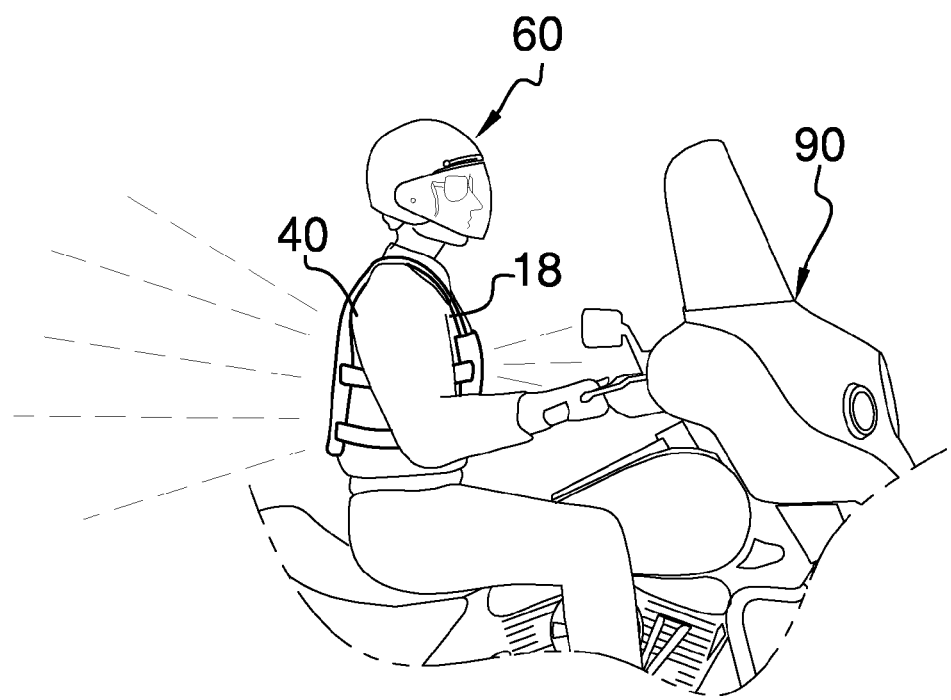
FIG. 5 is an in-use view of an embodiment of the disclosure.
Figure 6:
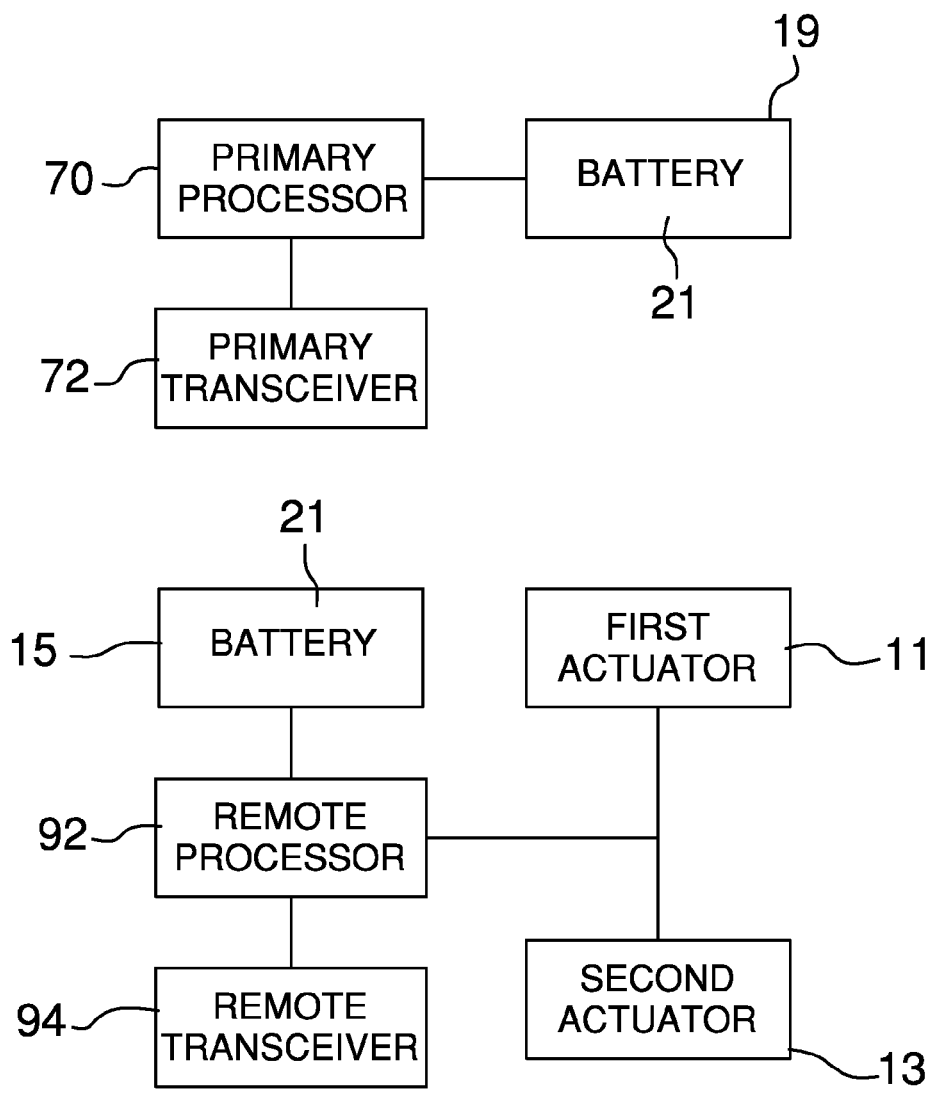
FIG. 6 is a schematic view of an embodiment of the disclosure.

As best illustrated in FIGS. 1 through 6, the illumination assembly 10 (hereinafter assembly) generally comprises a front panel 12. A bottom edge 14 of the front panel 12 has a width that is less than a width of a top edge 16 of the front panel 12. The front panel 12 has a trapezoidal shape that may have a width ranging between 15 cm and 30 cm and height between 25 cm and 35 cm. Further, the front panel 12 is positionable on a driver's chest 18 so a back side 20 of the front panel 12 abuts the driver's chest 18. A pair of pockets 22 are coupled to a front side 24 of the front panel 12 proximate an associated one of a first lateral edge 26 and a second lateral edge 28 of the front panel 12.

A back panel 30 is provided. A first lateral edge 32 and a second lateral edge 34 of the back panel 30 extend downwardly from a top edge 36 of the back panel 30 and intersect at a bottom point 38 of the back panel 30. The back panel 30 has a triangular shape that may have a width between 25 cm and 30 cm and a height between 35 cm and 45 cm. Moreover, the back panel 30 is positionable on the driver's back 40 so a back side 42 of the back panel 30 abuts the driver's back 40. A reflective strip 44 is coupled a front side 46 of the back panel 30. The reflective strip 44 is one of a plurality of reflective strips 44. Continuing, each of the plurality of reflective strips 44 is coextensive with an associated one of the top 36, first lateral 32 and second lateral 34 edges of the back panel 30.

A first end 48 of a shoulder strap 50 is coupled to the back side 20 of the front panel 12 proximate the top edge 16 of the front panel 12. Additionally, a second end 52 of the shoulder strap 50 is coupled to the back side 42 of the back panel 30 proximate the top edge 36 of the back panel 30. The shoulder strap 50 may have a length between 40 cm and 60 cm. Moreover, the shoulder strap 50 is one of a pair of the shoulder straps 50. A first one of the pair of shoulder straps 54 is positioned proximate the first lateral edge 32, 26 of each of the front 12 and back 30 panels. Additionally, a second one of the pair of shoulder straps 56 is positioned proximate the second lateral edge 28, 34 of each of the front 12 and back 30 panels. Each of the first 54 and second 56 shoulder straps selectively extends over an associated one of each of the driver's shoulders 58 so the front 12 and back 30 panels are retained on the driver 60.

A front lateral strap 62 is coupled to the front panel 12. Further, a back lateral strap 64 is coupled to the back panel 30. Each of the front 62 and back 64 lateral straps may have a length between 10 cm and 15 cm. A buckle 66 is coupled to a free end 68 of the back lateral strap 64. Additionally, a clip 69 is coupled to a free end 72 of the back lateral strap 64. The clip 69 engages the buckle 66 so the front 62 and back 64 lateral straps are coupled together.

The front lateral strap 62 is one of a pair of the front lateral straps 62 that is evenly distributed between the top edge 26 and the bottom edge 14 of the front panel 12. The back lateral strap 64 is one of a pair of the back lateral straps 64 that is evenly distributed between the top edge 36 and the bottom point 38 of the back panel 30. Further, the pair of the front lateral straps 62 comprises a pair of sets of the pairs of front lateral straps 66 each coupled to an associated one of the first lateral edge 26 and the second lateral edge 28 of the front panel 12. The pair of the back lateral straps 64 comprises a pair of sets of the pairs of back lateral straps 68 each coupled to an associated one of the first lateral edge 32 and the second lateral edge 34 of the back panel 30. Each of the pair of sets of the pairs of front 66 and back 68 lateral straps retains the front 12 and back 30 panels on the driver 60.

A primary processor 70 is coupled to the back panel 30. The primary processor 70 may be an electronic processor of any conventional design. A primary transceiver 72 is coupled to the back panel 30. The primary transceiver 72 is electrically coupled to the primary processor 70. Lastly, the primary transceiver 72 may be an RF transceiver of any conventional design.

A light emitter 74 is coupled to the back panel 30. The light emitter 74 is electrically coupled to the primary processor 70. Further, the light emitter 74 selectively emits light so the light emitter 74 may make the driver 60 visible to an observer. The light emitter 74 may be an LED light emitter of any conventional design.

The light emitter 74 is one of a plurality of the light emitters 74. Further, the plurality of light emitters 74 comprises a pair of sets of the light emitters 76. Each of a back one of the pair of sets of light emitters 78 is coupled to and evenly distributed along each of the first lateral edge 32 and the second lateral edge 34 of the back panel 30. Moreover, each of a front one of the pair of sets of light emitters 80 is slidably coupled to an associated one of the first 54 and second 56 shoulder straps proximate the top edge 16 of the front panel 12. Each of the front pair of light emitters 80 is positionable at a selected point on the associated one of the first 54 and second 56 shoulder straps.

A remote control 82 is provided. A clip 84 is coupled to a bottom 86 of the remote control 82. The clip 84 selectively engages a handle bar 88 on a vehicle 90 so the remote control 82 is retained on the vehicle 90. Moreover, the vehicle may be a motorcycle of any conventional design.

A remote processor 92 is coupled to the remote control 82. The remote processor 92 may be an electronic processor of any conventional design. A remote transceiver 94 is coupled to the remote control 92. The remote transceiver 94 is electrically coupled to the remote processor 92. Further, the remote transceiver 94 may be an RF transceiver of any conventional design. The remote transceiver 94 is in electromagnetic communication with the primary transceiver 72 so the remote transceiver selectively actuates the primary processor 70.

An actuator 96 is coupled to a top side 98 of the remote control 82. The actuator 96 is electrically coupled to the remote processor 92. Moreover, the actuator 96 is one of a pair of the actuators 96. A first one of the pair of actuators 11 selectively actuates the remote processor 92 so the remote processor 92 selectively actuates the remote transceiver 94. Each of the plurality of light emitters 74 emits light when the first actuator 11 is actuated. A second one of the pair of actuators 13 selectively de-actuating the remote processor 92. Lastly, each of the plurality of light emitters 74 ceases emitting light when the second actuator 13 is actuated.

A remote power supply 15 is coupled to the remote control 82. The remote power supply 15 is electrically coupled to the remote processor 92. Further, the remote power 15 supply comprises at least one battery 17 that may have an operational voltage between 3 VDC and 6 VDC. A primary power supply 19 is coupled to the back side 20 of the back panel 30. The primary power supply 19 is electrically coupled to the primary processor 70. Lastly, the primary power supply 19 comprising at least one battery 21 that may have an operational voltage between 6 VDC and 9 VDC.

In use, the driver 60 wears the front 12 and back panels 30 when the driver 60 is going to operate the vehicle 90 in low visibility conditions. Continuing, the driver 60 actuates the first actuator 11 to actuate the plurality of light emitters 74. The driver 60 actuates the second actuator 13 to de-actuate the plurality of light emitters 74. The assembly 10 increases a visibility of the driver 60 to an observer to increase the safety of the driver 60.

With respect to the above description, it is to be realized that the optimum dimensional relationship for the various components of the assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An illumination assembly for making a driver of a vehicle visible to an observer, said assembly comprising:

a front panel configured to be positioned on the driver;

a back panel configured to be positioned on the driver;

a shoulder strap coupled to said front and back panels wherein said front and back panels are retained on the driver;

a primary processor coupled to said front panel;

a primary transceiver coupled to said front panel, said transceiver being operationally coupled to said processor;

a light emitter coupled to said back panel, said light emitter being operationally coupled to said processor, said light emitter selectively emitting light wherein said light emitter is configured to make the driver visible to the observer;

a remote control configured to be selectively coupled to the vehicle;

a remote processor coupled to said remote control;

a remote transceiver coupled to said remote control, said remote transceiver being operationally coupled to said remote processor, said remote transceiver being operationally coupled to said primary transceiver wherein said remote transceiver selectively actuates said primary processor; and an actuator coupled to said remote control, said actuator being operationally coupled to said remote processor wherein said actuator selectively actuates said remote processor wherein said remote processor selectively actuates said remote transceiver.

2. The assembly according to claim 1 wherein a bottom edge of said front panel having a width being less than a width of a top edge of said front panel wherein said front panel has a trapezoidal shape.

3. The assembly according to claim 1 wherein said front panel being positionable on the driver's chest wherein a back side of said front panel abuts the driver's chest.

4. The assembly according to claim 1 wherein a first lateral edge and a second lateral edge of said back panel extending downwardly from a top edge of said back panel and intersecting at a bottom point wherein said back panel has a triangular shape.

5. The assembly according to claim 1 wherein said back panel being positionable on the driver's back wherein a back side of said back panel abuts the driver's back.

6. The assembly according to claim 1 wherein:
 a first end of said shoulder strap being coupled to a back side of said front panel proximate a top edge of said front panel; and
 a second end of said shoulder strap being coupled to a back side of said back panel proximate a top edge of said back panel.

7. The assembly according to claim 1 wherein:
 said shoulder strap being one of a pair of said shoulder straps;
 a first one of said pair of shoulder straps being positioned proximate a first lateral edge of each of said front and back panels;
 a second one of said pair of shoulder straps being positioned proximate a second lateral edge of each of said front and back panels; and
 each of said first and second shoulder straps selectively extending over an associated one of each of the driver's shoulders.

8. The assembly according to claim 1 wherein said primary transceiver being electrically coupled to said primary processor.

9. The assembly according to claim 1 wherein said light emitter electrically coupled to said primary processor.

10. The assembly according to claim 1 wherein said light emitter being one of a plurality of said light emitters.

11. The assembly according to claim 9 wherein said plurality of light emitters comprising a pair of sets of said light emitters.

12. The assembly according to claim 10 wherein each of a back one of said pair of sets of light emitters being coupled to and evenly distributed along each of a first lateral edge and a second lateral edge of said back panel.

13. The assembly according to claim 10 wherein each of a front one of said pair of sets of light emitters being coupled to an associated one of a first and second shoulder strap proximate a top edge of said front panel.

14. The assembly according to claim 1 wherein said remote transceiver being electrically coupled to said remote processor.

15. The assembly according to claim 1 wherein said remote transceiver being in electromagnetic communication with said primary transceiver.

16. The assembly according to claim 1 wherein:
 said actuator being coupled to a top side of said remote control;
 said actuator being electrically coupled to said remote processor;
 said actuator being one of a pair of said actuators;
 a first one of said pair of actuators selectively actuating said remote processor; and
 a second one of said pair of actuators selectively de-actuating said remote processor.

17. The assembly according to claim 1 wherein:
 a remote power supply coupled to said remote control;
 said remote power supply being electrically coupled to said remote processor; and
 said remote power supply comprising at least one battery.

18. The assembly according to claim 1 wherein:
 a primary power supply coupled to a back side of said front panel;
 said primary power supply being electrically coupled to said primary processor; and
 said primary power supply comprising at least one battery.

19. The assembly according to claim 1 wherein:
 a front lateral strap coupled to said front panel;
 a back lateral strap coupled to said back panel;
 a buckle coupled to a free end of said back lateral strap;
 a clip coupled to a free end of said back lateral strap;
 said clip engaging said buckle wherein said front and back lateral straps are coupled together;
 said front lateral strap being one of a pair of said front lateral straps being evenly distributed between a top edge and a bottom edge of said front panel;
 said back lateral strap being one of a pair of said back lateral straps being evenly distributed between a top edge and a bottom point of said back panel;
 said pair of said front lateral straps comprising a pair of sets of said pairs of front lateral straps each coupled to an associated one of a first lateral edge and a second lateral edge of said front panel; and
 said pair of said back lateral straps comprising a pair of sets of said pairs of back lateral straps each coupled to an associated one of a first lateral edge and a second lateral edge of said back panel.

20. An illumination assembly for making a driver of a vehicle visible to an observer, said assembly comprising:
 a front panel comprising a bottom edge of said front panel having a width being less than a width of a top edge of said front panel wherein said front panel has a trapezoidal shape, said front panel being positionable on the driver's chest wherein a back side of said front panel abuts the driver's chest;
 a back panel comprising a first lateral edge and a second lateral edge of said back panel extending downwardly from a top edge of said back panel and intersecting at a point wherein said back panel has a triangular shape, said back panel being positionable on the driver's back wherein a back side of said back panel abuts the driver's back;
 a first end of a shoulder strap being coupled to said back side of said front panel proximate said top edge of said front panel, a second end of said shoulder strap being coupled to said back side of said back panel proximate said top edge of said back panel, said shoulder strap being one of a pair of said shoulder straps;
 a first one of said pair of shoulder straps being positioned proximate said first lateral edge of each of said front and back panels;
 a second one of said pair of shoulder straps being positioned proximate said second lateral edge of each of said front and back panels;
 each of said first and second shoulder straps selectively extending over an associated one of each of the driver's shoulders wherein said front and back panels are retained on the driver;
 a front lateral strap coupled to said front panel;
 a back lateral strap coupled to said back panel;

a buckle coupled to a free end of said back lateral strap;
a clip coupled to a free end of said back lateral strap;
said clip engaging said buckle wherein said front and back lateral straps are coupled together;
said front lateral strap being one of a pair of said front lateral straps being evenly distributed between said top edge and said bottom edge of said front panel;
said back lateral strap being one of a pair of said back lateral straps being evenly distributed between said top edge and said bottom point of said back panel;
said pair of said front lateral straps comprising a pair of sets of said pairs of front lateral straps each coupled to an associated one of said first lateral edge and said second lateral edge of said front panel;
said pair of said back lateral straps comprising a pair of sets of said pairs of back lateral straps each coupled to an associated one of said first lateral edge and said second lateral edge of said back panel;
a primary processor coupled to said front panel;
a primary transceiver coupled to said front panel, said transceiver being electrically coupled to said primary processor;
a light emitter coupled to said back panel, said light emitter being electrically coupled to said primary processor, said light emitter selectively emitting light wherein said light emitter is configured to make the driver visible to the observer, said light emitter being one of a plurality of said light emitters, said plurality of light emitters comprising a pair of sets of said light emitters;
each of a back one of said pair of sets of light emitters being coupled to and evenly distributed along each of said first lateral edge and said second lateral edge of said back panel;
each of a front one of said pair of sets of light emitters being coupled to an associated one of said first and second shoulder straps proximate said top edge of said front panel;
a remote control configured to be selectively coupled to the vehicle;
a remote processor coupled to said remote control;
a remote transceiver coupled to said remote control, said remote transceiver being electrically coupled to said remote processor, said remote transceiver being in electromagnetic communication with said primary transceiver wherein said remote transceiver selectively actuates said primary processor;
an actuator coupled to a top side of said remote control, said actuator being electrically coupled to said remote processor, said actuator being one of a pair of said actuators;
a first one of said pair of actuators selectively actuating said remote processor wherein said remote processor selectively actuates said remote transceiver;
a second one of said pair of actuators selectively de-actuating said remote processor;
a remote power supply coupled to said remote control, said remote power supply being electrically coupled to said remote processor, said remote power supply comprising at least one battery; and
a primary power supply coupled to said back side of said front panel, said primary power supply being electrically coupled to said primary processor, said primary power supply comprising at least one battery.

\* \* \* \* \*